United States Patent [19]

Maglio

[11] 4,407,772
[45] Oct. 4, 1983

[54] METHOD OF PRODUCING A CONTOURED DISK WHEEL

[75] Inventor: Ralph A. Maglio, Wadsworth, Ohio

[73] Assignee: The Firestone Tire & Rubber Company, Akron, Ohio

[21] Appl. No.: 382,854

[22] Filed: May 28, 1982

Related U.S. Application Data

[63] Continuation-in-part of Ser. No. 128,003, Mar. 7, 1980, abandoned.

[51] Int. Cl.³ .......................... B29C 17/00; B29C 3/00
[52] U.S. Cl. ..................... 264/294; 156/194; 156/245; 264/324; 264/347
[58] Field of Search ............. 264/257, 258, 134, 137, 264/285, 294, 320, 322, 347, 324; 156/194

[56] References Cited

U.S. PATENT DOCUMENTS

| | | | |
|---|---|---|---|
| 1,631,668 | 6/1927 | Briggs | 156/194 |
| 1,812,285 | 6/1931 | Christie | 156/194 |
| 1,841,346 | 1/1932 | Smith | 264/258 |
| 1,912,083 | 5/1933 | Lytle | 156/194 |
| 2,196,569 | 4/1940 | Stroehlia et al. | 156/194 |
| 2,400,533 | 5/1946 | Buffington | 156/194 |
| 2,596,162 | 5/1952 | Muskat | 264/137 |
| 2,676,823 | 4/1954 | Olson et al. | 264/257 |
| 3,246,054 | 4/1966 | Guenther et al. | 264/137 |
| 3,743,561 | 7/1973 | Koontz et al. | 264/137 |
| 3,966,523 | 6/1976 | Jakobsen et al. | 264/258 |
| 4,072,358 | 2/1978 | Ridha | 301/63 PW |
| 4,289,168 | 9/1981 | Lecourt et al. | 264/137 |
| 4,294,490 | 10/1981 | Woelfel | 301/63 PW |
| 4,294,639 | 10/1981 | Woelfel et al. | 156/194 |
| 4,376,749 | 3/1983 | Woelfel | 264/137 |

FOREIGN PATENT DOCUMENTS 225667 11/1924 United Kingdom ................ 156/194

*Primary Examiner*—Willard E. Hoag
*Attorney, Agent, or Firm*—Olaf Nielsen

[57] ABSTRACT

A method is disclosed for forming a contoured disk wheel by placing a maturated fiber-reinforced resin cylinder between male mold members and encircling mold members, closing the mold members about the cylinder causing it to flow axially and radially, and curing it.

3 Claims, 6 Drawing Figures

METHOD OF PRODUCING A CONTOURED DISK WHEEL

This is a continuation-in-part of application Ser. No. 128,003, filed Mar. 7, 1980 and now abandoned.

TECHNICAL FIELD

The invention is directed to the making of composite contoured vehicle disk wheels by loading, or charging, a multi-piece circular mold with a thermosetting maturated molding compound comprised of fiber-reinforced plastic, and thereafter subjecting such charge to pressure and heat in a mold for a finite time. Care must be taken in the charging of the mold in order to minimize blistering, delaminations, voids and so-called knit-lines in the finished product.

BACKGROUND ART

At present, a typical manufacturing method for complicated shapes includes building up a required weight or volume of molding compound by forming a laminate of plies of chopped fiberglass pre-impregnated with a plastic such as a thermosetting synthetic resin which may include a catalyst, plus fillers and the like, and thereafter curing the material in a mold under heat and pressure. The wheel may consist entirely of the molding compound or it may incorporate rigid reinforcing members at points of particular stress.

Cut sheets of molding compound (SMC) may be stacked in the mold in a rosette pattern with overlapping edges, such as described in U.S. Pat. No. 3,369,843 to Prew. Other known patterns for arranging the plies of the charge may be stacks of square, rectangular or circular sheets, simply axially stacked with coinciding edges, or rotated in a radial plane with respect to each other; or in pinwheels, or pyramids. SMC may also be charged as a roll or an annulus placed in the mold with its center line lying in a plane parallel to the mold base. However, the products of these charges tend to exhibit, for example, knit-lines, non-uniformity and voids where spaces between lamina, both radially and axially, originally existed in the charge pattern.

SUMMARY OF THE INVENTION

It is accordingly a primary object of the present invention to provide an improved method of producing a compression-molded reinforced plastic composite wheel; further, to provide the specially shaped charge with which to practice that method.

Additionally, it is an object to provide a fiberglass-resin composite wheel of lighter weight than a comparable size steel wheel, but of at least equivalent performance, thus providing a benefit in reduction of the unsprung weight of a vehicle.

A further object is to produce a composite wheel of improved uniformity which will have a reduced tendency toward voids and knit-line cracks, as well as improved three-dimensional, interply knitting of the fibers.

In order to achieve these and other objects, a circular mold is preferably charged with a cylinder of molding compound which has its axis generally parallel to the axis of the mold, and preferably is coaxial with the mold. Although such a cylinder of molding compound may be produced, by adaptation of present equipment, by forming fiberglass and resin into a sausage-like shape which may be placed directly into the mold, it has been found useful for the present purposes to wind a mat of sheet molding compound spirally into the desired cylindrical charge.

Typically, chopped glass fibers randomly distributed in a thermosetting resin form a sheet of molding compound which is then spirally wound to form a solid cylinder wherein glass-fiber is distributed randomly in all directions. Since the standard deviation of glass content in the sheet molding compound varies between plus two and minus two percent, the spiral winding tends to level out this variation. This cylinder is placed between the mold portions, with its axis generally coaxial with that of the mold.

As the press carrying the mold closes, the mold portions physically move the molding compound axially and radially, while the heat applied helps to induce its flow.

PREFERRED MODE OF CARRYING OUT THE INVENTION

Figure 1:
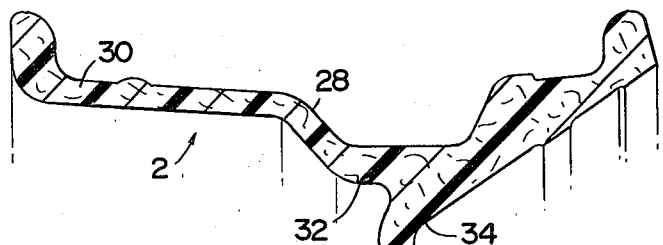
FIG. 1 is a sectional view of one-half of a cured composite wheel.
Figure 2:
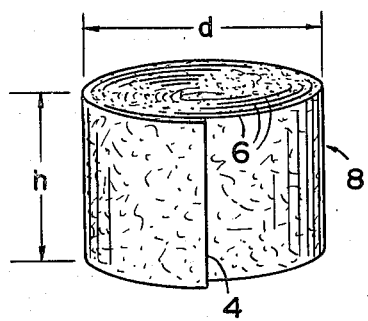
FIG. 2 is a perspective view of the uncured cylindrical mold charge of the invention.

A typical wheel for practicing the invention is shown at 2 in FIG. 1 and was chosen to be a 13×6 passenger vehicle wheel, denoting a 13 inch (33 cm) diameter and a 6 inch (15.2 cm) axial width.

The molding compound was comprised of 25 parts by weight of a vinylester resin/catalyst compound, supplied by Dow Chemical Company under the name "Derakane 790"; 50 parts of chopped one-inch (2.54 cm) randomly distributed E-glass supplied by Owens Corning Fiberglass Company; and 25 parts of a calcium carbonate filler. Other thermosetting polyamides, epoxies, polyesters, and vinyl esters may be chosen. Small amounts of molding aids such as mold-release agents and maturation-controls may be contained within the compound, as well. Proportions of major components such as 35/65/0 and 25/55/20 were found not to be as useful or effective.

The above molding compound, prepared into a sheet 4 approximately 0.25 inch (0.64 cm) thick and weighing approximately 18 oz./sq. foot (5.48 kg/sq m.) was held for maturation for 5 days at 90° F. (32° C.) so as to improve the ease of handling. Maturation, although desirable, is not mandatory. The matured material was slit and rolled in a spiral 6 to form a closed cylinder body 8 having a spiral height (i.e., cylindrical length) of 5 inches (12.7 cm) and a spiral diameter of about 7 inches (17.8 cm). Experience with molding of wheels in this fashion has shown that the stability of the cylindrical charge, the uniformity of material flow, and thus the reproduceability, product to product, is improved when the ratio of charge height to charge diameter is equal to or less than one, and the cylinder diameter is in the range of 50–60% of the planar mold diameter. In the example here given, the spiral diameter is about 52% of the planar diameter. Since the operation is basically a no-waste process, the charge weight of about 12.3 pounds (5.6 kg) represents also the weight of the molded wheel. This compares to about 16 pounds (7.3 kg) for a typical steel wheel of the same size.

Figure 3:
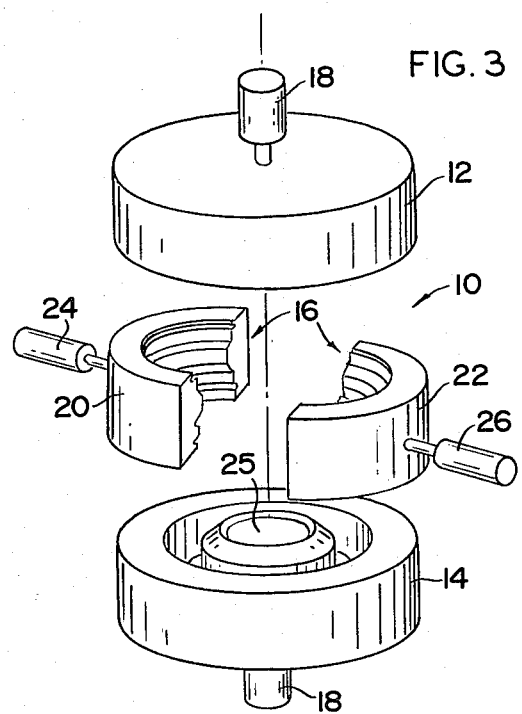
FIG. 3 shows a typical 4-piece wheel-mold in the open position.

The mold 10 shown in FIG. 3, usually held in a press, not shown, typically comprises male upper and lower members 12 and 14, and a collar portion 16 intermediate the upper and lower male members; the upper and lower members may be moved axially with respect to each other, such as by cylinders 18; the collar 16 typically consists of two halves 20 and 22 which are movable radially, such as by cylinders 24 and 26. These four parts, when closed, cooperate to form a cavity defining the wheel contour, in that the collar halves 20 and 22 form the interior face 28 of the rim-portion 30, while top and bottom mold portions 12 and 14 form the exterior rim-surfaces 32 and 34 and the disk portion 36.

Figure 4:
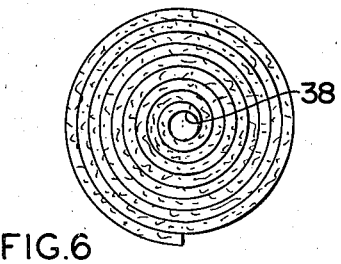
FIG. 4 shows, in simplified cross-section, the wheel-mold, partially closed, with the inventive charge in place.

In preparation for molding, the mold parts are heated to about 290°–300° F. (143°–150° C.), whereupon the uncured, maturated cylindrical charge 8 is set in place on an elevated portion 25 of the lower male mold member 14, as shown in FIG. 4. The cooperating mold collar members 20 and 22 are moved together around the male mold member 14 and the lower portion of cylindrical body 8. The second male member 12 is moved toward mold member 14 to close the mold, causing the maturated resin to flow axially and radially into the cavity formed by member 12, 14, 20 and 22, whereupon the resin is cured.

Flow direction is affected and complicated by the action of the mold member 12 as it compresses the charge well in advance of mold closure. This action produces major flow first center, (maximum charge height) just prior to full pressure on the closed mold. The axial flow will then occur as a wave across the mold surface, inducing additional radial and minor axial flow until the mold cavity has been filled.

As the mold is closed, the spiral charge is compressed, forcing the adjoining layers of sheet material to merge into each other losing their single sheet identity. This also tends to form a contiguous material flow front, sweeping air and gases ahead and out of the mold, avoiding entrapment and reducing the chances for void and knit line formation. The area in the center of the mold would be made up of fibers oriented in the radial plane, as well as through the axial plane of the product, enhancing its structural integrity.

Typically, the cure proceeds for about 5 minutes, at the above temperature, and at a pressure of 800–1000 pounds per square inch (56–70 kg/square cm). After completion of the cure, the press is opened, moving the mold parts apart, and the finished wheel is ejected by hydraulically-operated pins, well-known in the art and not shown. The upper or lower mold part may include other well-known means for forming bolt holes, hub openings and the like, also not shown.

Figure 6:
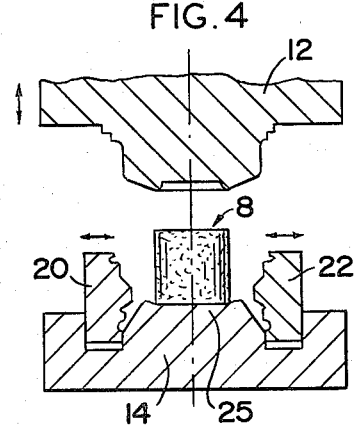
FIG. 6 is a plan view of a modified form of the charge of the invention.

It is contemplated that the uncured cylinder may be hollow axially; such an annular cylinder, shown in FIG. 6, may have a longitudinal opening 38 for receiving a guiding or holding pilot portion of the mold. Alternatively, the annular cylinder may form a mold charge for a final annular product which has no substantial center structure, such as for example a tire rim without a wheel-disk center.

Figure 5:
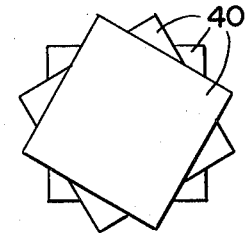
FIG. 5 is a plan view of a portion of a prior-art uncured mold charge-pattern.

The control against which the wheel of the present invention was tested was again 13×6 wheel, formed of the same materials as the test wheel and in the same proportions, and being of the same weight as the inventive wheel. However, instead of proceeding from a base of a spirally-wound cylinder, the prior art control wheel was formed from 0.25 inch (0.64 cm) thick molding sheets, cut into 8 inch (20 cm) squares 40, and stacked in rosette fashion (see FIG. 5), with each sheet rotated about 30° with respect to the adjacent sheet, and to give the same charge weight as the spirally-wound charge, i.e., about 12.3 pounds (5.6 kg). Press curing time, pressure and temperature were the same as for the spiral wrap wheel.

Both wheels were subjected to laboratory cornering tests under the same conditions of constant bending under rotation.

A bending moment of 12,560 inch-pounds (145 m-kg) was applied, as a force of 419 pounds (190 Kg) operating through a moment arm of 30 inches (0.76 m), between the rim edge and the center of the wheel, with a force variation of less than 41%, and the number of rotations measured before cracks appeared in the wheel disk.

The four control wheels tested ran an average of 2243 cycles before failure. The eight wheels of the invention were run an average of 208,636 cycles; testing of four of the inventive wheels was stopped after they had successfully completed more than 250,000 cycles without any indication of failure, one of them surpassing 400,000 cycles.

Thus, the test wheels bettered the control wheels by a factor of greater than 93.

In order to obtain correlation with the laboratory cornering tests, the wheels were subjected to the "G-turn" test, as follows: A vehicle equipped with test wheels on the front positions, is accelerated to 50 miles/hour (80 km/hr.), whereupon the steering wheel is turned to full lock, with full acceleration. The vehicle thereby describes a G-shaped path.

The test is repeated, turning the steering wheel in the opposite direction; each set of right and left turns constitutes one test cycle.

While the control wheels, constructed of 8-inch (20 cm) square sheet molding compound, were removed after a wheel failure in the sixth test cycle, the two inventive wheels were removed after 24 cycles without any failures. This demonstrates a superiority of the inventive wheels of better than 4 to 1.

What is claimed is:

1. Method for making a contoured disk wheel comprising:
    (a) spirally winding a sheet containing thermosetting resin and randomly oriented fibers into a substantially cylindrical body, and partially curing said resin;
    (b) disposing said body in end-abutting position on an elevated, substantially flat end portion of a first male mold member;
    (c) moving cooperating mold members together about said first male mold member and about a lower portion of said body, said male mold member and said cooperating mold members defining at least part of a mold cavity therebetween;
    (d) heating said sheet and axially moving a second male mold member toward said first male mold member, causing the partially cured resin to flow radially outwardly and axially into the said mold cavity around the periphery of said first mold member; and (e) curing said resin to form said disk wheel.

2. The method of claim 1, wherein said second mold member causes a major resin flow first in a radial direction.

3. The method of claim 1, wherein the diameter of said cylindrical body is in the range of 50-60% of the planar diameter of the wheel.

* * * * *